United States Patent [19]
Tompkins et al.

[11] 3,797,014
[45] Mar. 12, 1974

[54] AUTOMATIC RADAR TARGET DETECTION AND SCAN CONVERSION SYSTEM

[75] Inventors: Birnam R. Tompkins, Plano; John K. Smith, Dallas, both of Tex.

[73] Assignee: Texas Instruments Incorporated, Dallas, Tex.

[22] Filed: Sept. 21, 1970

[21] Appl. No.: 74,097

[52] U.S. Cl. .............................. 343/5 DP, 343/5 SC
[51] Int. Cl. ............................................... G01s 9/06
[58] Field of Search...343/5 DP, 17.1, 5 SC, 112 CA, 343/8

[56] References Cited
UNITED STATES PATENTS

| | | | |
|---|---|---|---|
| 3,208,064 | 9/1965 | Morrel | 343/112 CA |
| 3,514,707 | 5/1970 | Campanaro et al. | 343/5 DP |
| 3,430,235 | 2/1969 | Bender et al. | 343/5 DP |
| 3,633,173 | 1/1972 | Edge | 343/5 DP |
| 3,539,978 | 11/1970 | Stedtnitz | 343/5 DP |
| 3,353,177 | 11/1967 | Wilmot | 343/5 DP |
| 3,386,091 | 5/1968 | Wilmot et al. | 343/5 DP |
| 3,631,486 | 12/1971 | Anders et al. | 343/5 DP |

OTHER PUBLICATIONS

Skolnik, Introduction To Radar Systems, McGraw-Hill, 1962, pp. 164, 165, 175.

*Primary Examiner*—Maynard R. Wilbur
*Assistant Examiner*—G. E. Montone

[57] ABSTRACT

The specification discloses an automatic detection system for use with, for example, an airborne radar system. Automatic gain control circuitry is responsive to a predetermined false alarm rate for varying the amplitude of radar video signals derived from the airborne radar system. Threshold circuitry is connected to the output of the automatic gain control circuitry for passing only the radar video signals above a selected threshold. A pulse-to-pulse processor operates upon the output signals from the threshold circuitry to generate signals representative of the existence of a valid target return only if the target return occurs for a predetermined consecutive number of radar returns. A scan-to-scan processor is responsive to the output of the pulse-to-pulse processor for generating a valid target signal only when a predetermined number of target returns occur during a selected number of radar antenna scans. A final processor processes the output of the scan-to-scan processor longer than a lifetime of clutter spikes in order to generate an output signal representative of valid target returns. A range stabilization system stabilizes the pulse-to-pulse processor, scan-to-scan processor, and final processor with respect to range in dependence upon the aircraft velocity. A north stabilization circuit stabilizes the scan-to-scan processor and final processor with respect to a predetermined azimuth to enable operation of the system during an aircraft turn. A digital scan converter system is responsive to the output of the final processor for operating a multi-mode display.

10 Claims, 30 Drawing Figures

INVENTORS:
JOHN K. SMITH
BIRNAM R. TOMPKINS

INVENTORS:
JOHN K. SMITH
BIRNAM R. TOMPKINS

INVENTORS:
JOHN K. SMITH
BIRNAM R. TOMPKINS

AUTOMATIC RADAR TARGET DETECTION AND SCAN CONVERSION SYSTEM

This invention relates to radar systems, and more particularly relates to an automatic detection system for use with an airborne radar system to provide indications of valid target returns.

Conventional airborne radar systems generate indications of target returns which are directly displayed on a radarscope. The operator of the radar is thus required to carefully monitor the radarscope in order to distinguish between real targets and false indications caused by clutter or noise. A need has thus arisen for an automatic system to monitor the output of a radar system and to display only valid target indications, even in a heavy clutter environment such as a sea area. It has also heretofore been common to utilize an analog scan converter tube to provide integration and persistence in radarscope displays. Such scan converter tubes have not been completely satisfactory with respect to reliability and resolution, and have presented difficulties in providing azimuth and range stabilization of indicated targets.

In accordance with the present invention, an automatic detection system is provided for use with high resolution radar systems and includes circuitry for receiving a radar video signal. Threshold circuitry passes only portions of the video signal above a threshold to indicate target reflections. A pulse-to-pulse processor is responsive to the output of the threshold circuitry for determining the presence of a target reflection for a predetermined consecutive number of radar returns. Scan-to-scan processor circuitry is connected to the output of the pulse-to-pulse processor and is operable to generate an output signal when a predetermined number of target reflections occur during a selected number of radar antenna scans. A final processor discriminates between valid target reflections and false alarms in order to generate an output video signal of the valid target reflections for display to the system operator.

In accordance with another aspect of the invention, an automatic gain control circuit is utilized in combination with an automatic radar detection system and includes circuitry for receiving radar video signals. A memory is provided for storing of digital control values for the video signals in corresponding azimuth and range cells. An attenuator is controlled by the stored digital control values in the memory for attenuating the radar video signals. Circuitry is responsive to a selected input false alarm rate for varying the digital control values.

In accordance with another aspect of the invention, a digital scan converter is utilized to display the output from the radar automatic detection system. The converter includes a core storage for storing target history in azimuth and range cells. Structure is provided to selectively readout the stored data display the data on a radar display to indicate valid target reflections.

In accordance with a more specific aspect of the invention, an automatic radar detection system operates with an airborne radar system for generating radar video signals. Automatic gain control circuitry is responsive to a predetermined false alarm rate for varying the amplitude of the radar video signals. Threshold circuitry passes only the radar video signals above a selected threshold. A pulse-to-pulse processor is connected to the output of the threshold circuitry for generating a signal representative of the existence of a valid target return only if the target return occurs for a predetermined consecutive number of radar returns. A scan-to-scan processor is connected to the output of the pulse-to-pulse processor for generating a valid target signal only when a predetermined number of target returns occur during a selected number of radar antenna scans. A final processor processes the output from the scan-to-scan processor longer than a lifetime of sea clutter spikes to generate an output signal representative of valid target returns. Circuitry is provided to stabilize the pulse-to-pulse processor, scan-to-scan processor, and final processor with respect to range in dependence upon the aircraft velocity. Circuitry is also provided for stabilizing the scan-to-scan processor and final processor with respect to a predetermined azimuth.

For a more complete understanding of the present invention and for further objects and advantages thereof, reference is now made to the following description taken in conjunction with the accompanying drawings, in which:

FIGS. 5a–g are waveforms illustrating timing of portions of the pulse-to-pulse processing system;

FIGS. 20a–e are timing waveforms for operation of the scan converter.

Figure 1:
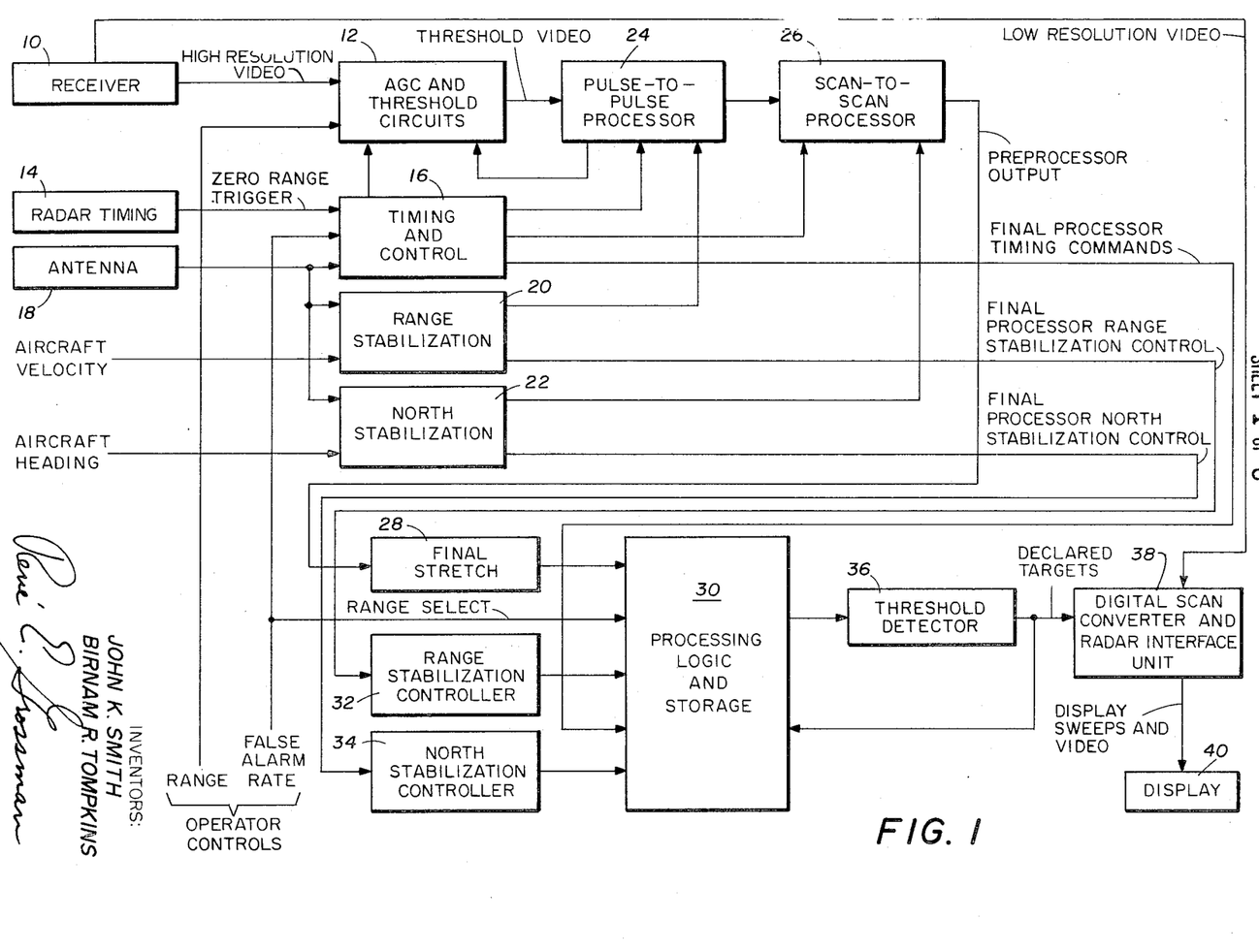
FIG. 1 is a block diagram of the present automatic detection and digital scan conversion system.

Referring to FIG. 1, a block diagram of the present automatic detection system is illustrated. High resolution radar video signals are fed from a radar receiver unit 10 which is included within the radar system with which the present system is utilized. The video signals are fed to AGC and threshold circuits 12, wherein thresholding of the video is performed to maintain the critical input false alarm rate. Unique automatic gain control is necessitated by the desirability of not maintaining a constant input false alarm rate as a function of range, but instead providing an increasing input false alarm rate upon increasing range. A radar timing signal noted as the Zero Range Trigger is generated by the radar timing unit 14 of the radar system, and is utilized to initiate a timing function within the timing and control circuit 16 of the automatic detection system.

The operator of the present system may initiate range control signals which are also applied to the timing and control circuit 16. The operator may also select the false alarm rate by controls which are applied to the AGC and threshold circuits 12. Antenna position information is supplied from the radar system antenna 18 and is applied to the timing and control circuit 16, the range stabilization controller 20 and the north stabilization controller 22. Indications of the aircraft velocity are supplied from the aircraft navigational system and are applied to the range stabilization controller 20. Indications of the aircraft heading are also supplied from the aircraft navigational system and are applied to the north stabilization controller 22.

The processed video signal, termed the threshold video signal, is applied to a pulse-to-pulse processor 24. Timing and control signals are applied to the processor 24 from the timing and control circuit 16, and range stabilization control signals are also applied to the processor 24 from the controller 20. The output of the processor 24 is applied through a scan-to-scan processor 26, which also receives timing and control signals from circuit 16 and north stabilization control signals from the controller 22. The processors 24 and 26, in combination with the threshold circuits 12, control circuit 16 and controllers 20 and 22, comprise a preprocessor which processes the radar returns before data is transferred to the final processor, to be subsequently described. During processing in the preprocessor, the selected area is divided into range/ azimuth cells which are ground stabilized during the processing interval.

The pulse-to-pulse processor 24 requires that a target to be present in the same range cell for two consecutive radar returns. The objective of the scan-to-scan processor 26 is to reduce data by requiring that a target be present for three out of N antenna scans, wherein N may be set from 4–7, and is preferably set 5. The selection of 3 out of 5 criteria is considered an excellent trade-off between target detection, clutter rejection and ground stabilization. To perform high range resolution scan-to-scan processing, the total area involved is accurately stabilized in range by the controller 20 for the processing interval. The north stabilization controller 22 enables the present system to perform scan-to-scan processing during an aircraft turn.

The output from the preprocessor is applied to a final stretch circuit 28, the output of which is applied to a processing logic and storage system 30. A range select signal may be applied by the operator to the processing logic and storage 30. The output from the range stabilization controller 20 is applied through a range stabilization controller 32 to the processing logic and storage 30. Final processor timing commands are applied from the circuit 16 to the processing logic and storage 30, and final processing north stabilization control signals are applied through a north stabilization controller 34 to the processing logic and storage system 30. The output of the storage system 30 is applied through a threshold detector 36 and provides an indication of declared targets, which are then fed to a digital scan converter and radar interface unit 38. Unit 38 controls the display sweeps and video of a multi-mode display 40 to provide a visual indication of the automatic detection results. The digital scan conversion provided by unit 38 eliminates the requirement of the conventional scan converter tube and provides improved target display.

The processing logic and storage system 30, along with its associated circuits, comprises a final processor whose primary function is to discriminate between targets and false alarms by processing the data for a period longer than the lifetime of large clutter spikes. The final processor may be provided with any of three basic modes of operation for accomplishment of its objectives. One mode retains the last N preprocessor decisions in storage for each range cell. A valid target is declared when M of the last N decisions exceeds the scan-to-scan threshold (M    N). A second mode of operation, referred to as the linear/dump mode, measures the life span of a return which has exceeded the scan-to-scan threshold. This mode of operation determines the end of the life span by counting consecutive misses from a return which has previously exceeded the scan-to-scan threshold. A target is declared when a life span exceeds an adjustable threshold. All past history is erased when the end of the life span is detected.

The preferred mode of operation of the final processor is referred to as the linear-up/down mode. In this mode of operation, a register is utilized to accumulate data from each range cell. Each time the scan-to-scan threshold is exceeded, a value of one is added to the stored value in the register. When the threshold is not exceeded, a value of one is subtracted from the value in the register. A target is declared whenever the stored value exceeds an adjustable threshold.

Track option circuitry is also included in the final processor to allow detection of a target which may change range cells before the target is identified. Logic circuitry performs the tracking operation by monitoring the output of the preprocessor. When the preprocessor output exceeds the scan-to-scan threshold in a range cell with no past history of a threshold crossing, the adjacent range cells are monitored to determine if a target has changed range cells. If the target has moved, then its new range cell is updated with the past history stored in the old range cell. At the end of every scan-to-scan processing interval, a command is sent from the control circuit 16 to update the final processor. The portion of the memory used to store data in the final processor is addressed so that the proper data is available to the processed with the data coming from the preprocessor. This data is processed as previously noted and then is relocated in its proper memory location. The processed data is likewise sent through threshold logic and if the data exceeds the selected threshold setting, a valid target is declared.

AGC AND THRESHOLD CIRCUITS

Figure 2:
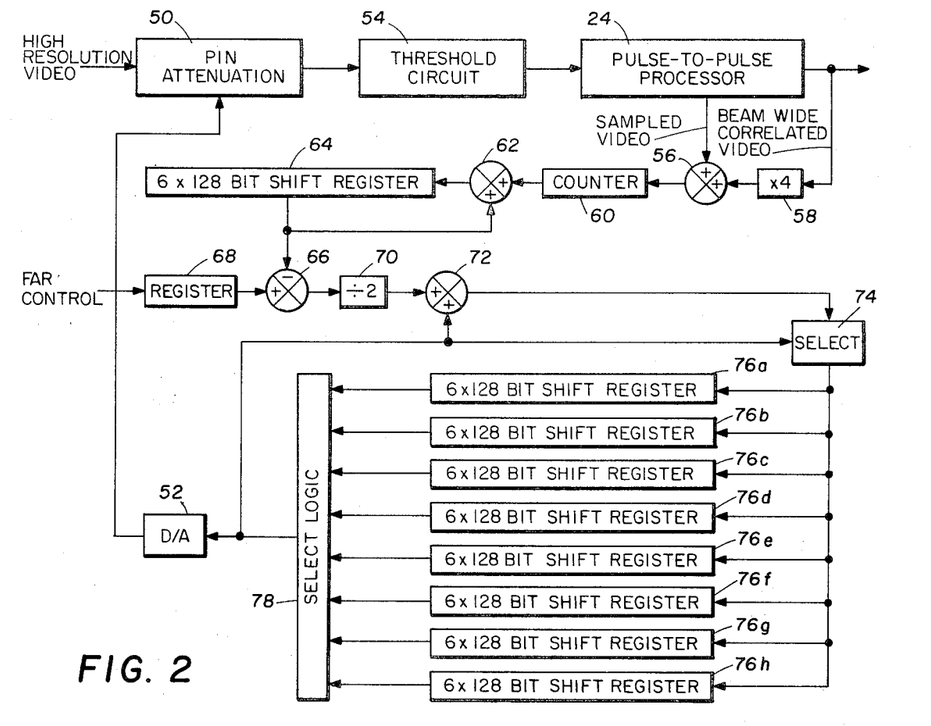
FIG. 2 is a block diagram of the automatic gain control circuitry of the invention.

FIG. 2 illustrates in greater detail the AGC and threshold circuits 12 shown in FIG. 1. The high resolution radar video data is fed through a pin attenuator 50, the attenuation of which is controlled by a control voltage generated by a digital-to-analog converter 52. The attenuated video signal is fed through a threshold circuit 54 and applied to the pulse-to-pulse processor 24, previously described. A sampled video signal is applied from the processor 24 to a summing circuit 56, wherein the signal is summed with a beam wide correlated video signal from the processor 24 which is previously fed through a x4 multiplier 58. The summed output is applied through a counter 60 to a summing network 62.

The output of summing network 62 is applied to a 6 x 128 bit shift register 64. The output of the shift register 64 is applied back to the summing network 62 and also to the negative side of a summing network 66. The false alarm rate control signal selected by the operator is applied to a register 68 and the output of register 68 is connected to the summing point network 66. The resulting summed signal is applied to a divider 70, the output of which is connected to a summing network 72. The output of the summing network 72 is applied through a select circuit 74 to the inputs of eight parallel 6 × 128 bit shift registers 76a–h. The outputs of the registers 76a–h are connected through select logic 78 and are applied through the digital-to-analog converter 52. The outputs from a select logic 78 are also applied to the summing network 72 and to the select circuit 74. The shift registers 76a–h may comprise any suitable digital storing means such as flip-flop chains, magnetic cores or the like. However, in the preferred embodiment, large scale integration (LSI) shift registers are utilized to provide the capability of operation at the required MHz clock rates.

In operation of the automatic gain control system shown in FIG. 2, the system acts as closed loop system to provide an input false alarm rate which is a function of clutter density. The area to be processed in the system is divided into eight azimuth bins each approximately 28.8°, and each azimuth bin is divided into 128 range cells. Each of the range cells covers the range of 16 preprocessor range cells, to be later described. A six-bit digital word is utilized to store the control voltage for each range cell in the eight azimuth bins. These digital words are stored in the 128 word shift registers 76a–h for each of the azimuth bins.

As the radar antenna scans, the proper azimuth bin is selected by the select circuit 74 and the control voltage is obtained by cycling the proper one of the shift registers 76a–h through the digital-to-analog converter 52 to control the pin attenuator 50. The attenuation of the high resolution video is thus varied. The incoming video is then thresholded in the threshold circuit 54 and applied to the pulse-to-pulse processor 24. Both the sampled video and the beam wide correlated video signals from the pulse-to-pulse processor are accumulated for 28.8° within the register 64. An error signal is generated from the summing network 66 by comparing the accumulated results with the desired results determined by the false alarm rate control signal applied through the register 68. The control words located in the shift register 64 are corrected by a value of ½ the error signal by the divider 70 and stored within the proper register 76a–h through the select circuit circuit 74 for use during the next scan.

Initially, each of the words in the shift registers 76a–h are set to the maximum value of 63. If the control word which corresponds to the desired input false alarm rate is a value of 31, then the minimum number of scans required to correct the control word is 6. To insure that the input false alarm rate is a function of clutter density, the beam wide correlated video from the pulse-to-pulse processor 24 is weighted four times as heavy as the sample video by the multiplier 58. This means that if a threshold crossing occurs in the same preprocessor range cell from two consecutive radar returns, a total count of six is accumulated in a register 64, including two counts occurring when the sample video is monitored on each radar return and four counts occurring when the beam wide correlated video is monitored after every two radar returns.

If the two threshold crossings occur in the same preprocessor range cell, but the crossings are not present on two consecutive returns, the total count accumulated is only two. Thus, in a heavy clutter area, most threshold crossings receive three times the weight that most threshold crossings receive in a noise region. Therefore, if the desired accumulated total for each range bin is a number which corresponds to a fixed total false alarm rate in the heavy clutter region, which is chosen by the operator, then for this total to be accumulated in the noise region, the input false alarm rate must be three times as great. By the use of the present automatic gain control shown in FIG. 2, the input false alarm rate will thus increase with range as the transition is made from the predominantly clutter region into the predominantly noise region. This feature results in a greater probability of detection in the noise region, assuming a constant final threshold, without increasing the output false alarm rate.

PULSE-TO-PULSE PROCESSOR

Figure 3:
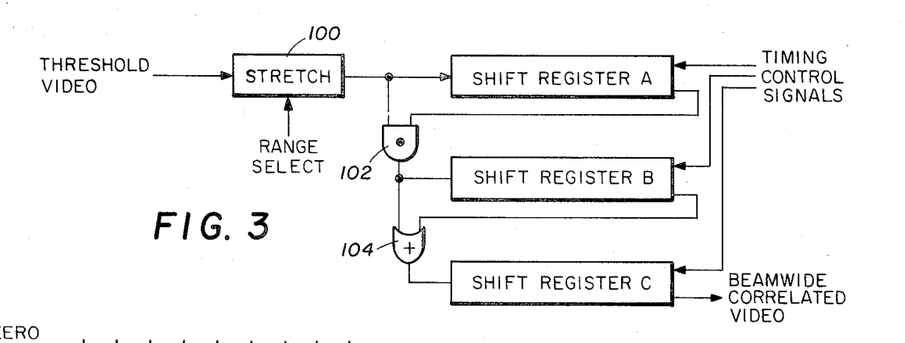
FIG. 3 is a block diagram of the pulse-to-pulse processor system of the invention.

FIG. 3 is a block of the pulse-to-pulse processor 24 shown in FIG. 1. The threshold video signal generated from the threshold circuit 12 is applied through a stretch circuit 100 which stretches the threshold video to the selected range resolution. The range select signal applied to the stretch circuit 100 may be selected by the operator. The stretched video signals are applied to a shift register A and to the input of an AND gate 102. The output of shift register A is also applied to the AND gate 102, and the output of the gate 102 is applied to the input of a shift register B and to the input of an OR gate 104. The output of the shift register B is also applied to the OR gate 104 and the resulting gate output is applied to a shift register C. The output of register C comprises the previously noted beam wide correlated video signal. Timing control signals are applied to each of the shift registers A, B and C from the timing and control circuits 16.

Each of the shift registers A, B and C preferably comprise Large Scale Integration (LSI) shift registers. The LSI shift registers are necessary to provide the capability of operation at the required clock rates within the MHz range.

Figure 4:
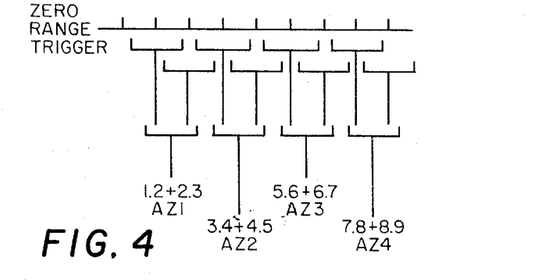
FIG. 4 is a graph illustrating the "sliding window" processing technique of the pulse-to-pulse processor system.

The function of the pulse-to-pulse processor 24 is to reduce data by requiring that a target be present for two consecutive radar returns. To determine whether or not this requirement is met, a "sliding window" process is used in the operation of the circuit shown in FIG. 3. A threshold of two consecutive hits out of N returns is required where N may be set to any number. This "sliding window" process is illustrated in FIG. 4, wherein it may be seen that a threshold of two consecutive hits out of three is required. In FIG. 4, the zero range trigger is illustrated as the timing pulse, and it may be seen that a processor output noted as AZ1, AZ2, etc. is generated from processor 24 only when two consecutive target returns out of each three radar returns are present.

Figure 5:
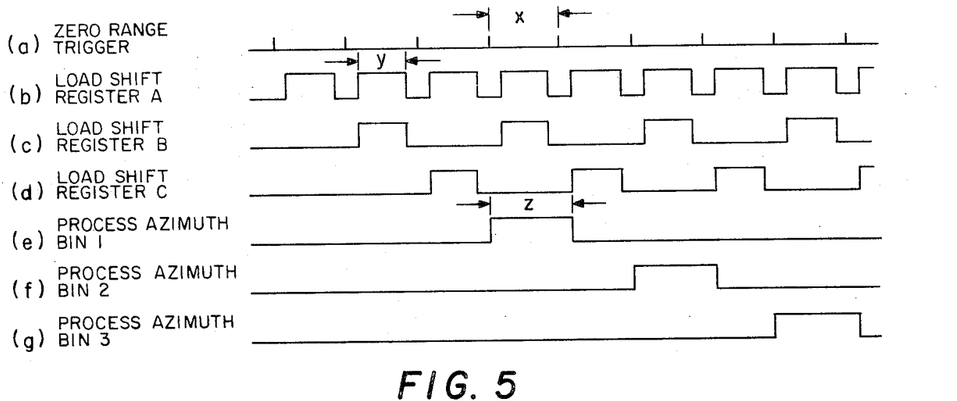

FIGS. 5a–g illustrate the gating sequence for loading the shift registers A, B and C shown in FIG. 3, in order to provide the "sliding window" process shown in FIG. 4. The timing cycle for the pulse-to-pulse processor 24 is initiated by the zero range trigger, as shown in FIG. 5a. Upon reception of the trigger, a counter in the timing and control circuit 16 is initiated and is allowed to run for a period of time corresponding to desired range inserted into the system. This range includes the ground stabilization correction. At this time, the clocks for the shift registers within the timing and control circuitry 16 are begun and clock pulses are gated to the proper shift registers. In the gating signal shown in FIG. 5b, the video from the first transmitted pulse is sampled and loaded into shift register A during the loading periods "Y". Video from the second transmitted pulse is sampled and is then combined by the AND gate 102 with the data in shift register A and the results are loaded into shift register B during the loading periods shown in FIG. 5c. At the same time, the sampled video is also loaded into shift register A. Video from the third transmitted pulse is sampled and combined with the data in shift register A as described above. The resulting data is then combined with the data stored in shift register B by the OR gate 104 and loaded into shift register C as shown by FIG. 5d. The sampled video is also loaded into shift register A in the manner previously described.

At this point, shift register C contains the results of the pulse-to-pulse processing for azimuth bin one denoted as AZ1 in FIG. 4. To transfer the data to the scan-to-scan processor 26, clock pulses are gated to the shift register C to shift the data serially into the processor 26, as shown by FIG. 5e. A clock rate in the MHz range is used for this purpose, as this clock rate is compatible with the scan-to-scan processing rate and allows the shift register to be completely unloaded before the data or azimuth bin 2 is ready to be loaded in the shift register C. As may be seen from FIGS. 5f and 5g, the above described sequence is continued in the same manner to allow data for the remaining azimuth bins to be obtained.

SCAN-TO-SCAN PROCESSOR

Figure 6:
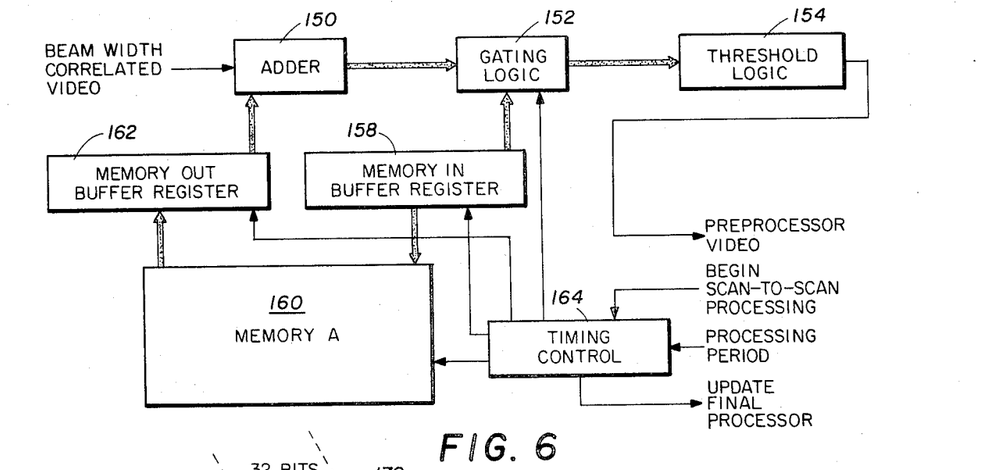
FIG. 6 is a block diagram of the scan-to-scan processor of the system.

FIG. 6 illustrates in block diagram form the scan-to-scan processor 26 shown in FIG. 1. The beam width correlated video signal derived from the pulse-to-pulse processor 24 is fed to an adder circuit 150. The sum signal from circuit 150 is fed through gating logic 152 which gates signals through threshold logic 154 to provide preprocessor video signals. Gating logic 152 also gates signals through a memory in buffer register 158 which applies signals into the core memory 160. Stored data from the memory 160 is fed through a memory out buffer register 162 and fed to the adder 150 for adding with the beam width correlated video. Timing control signals are fed from a timing control circuit 164 in order to control the operation of the memory input and output functions. The timing control circuit 164 operates to begin a scan-to-scan processing signal and a processing period signal. The timing control 164 also generates an update final processor signal which is fed to the final processor of the system.

In operation of the scan-to-scan processor illustrated in FIG. 6, the system reduces the data of the system by requiring that a target be present for three out of N scans, wherein N in the preferred embodiment is set at five. The selection of the three out of five criteria is found to work well as a trade-off between target detection, clutter rejection and ground stabilization. When the shift register C shown in FIG. 3 is loaded with the appropriate data in the pulse-to-pulse processor 24, the begin scan-to-scan processing signal is sent to the timing control 164 to initiate the loading sequence. Clock pulses are then sent from the timing control 164 to the shift register C to serially shift the data into the scan-to-scan processor. At this time, the proper azimuth bin of the memory 160 is addressed and the data is read from the memory 160 through memory out buffer 162 at a rate such that the data for each range cell matches the range of the data from the pulse-to-pulse processor 24.

The data from shift register C (FIG. 3) is added by circuit 150 to the data from the memory 160 and is then reloaded into the memory 160 through register 158. At the end of the scan-to-scan processing interval, which in the preferred embodiment is five scans, the accumulated data is sent through threshold logic 154 to determine if the three out of five criteria is satisfied. The results are then sent to the final processor. At this time, the memory 160 used for the scan-to-scan processing storage is cleared and the memory 160 is ready to begin processing for the next five scans.

Figures 7, 8, 9:
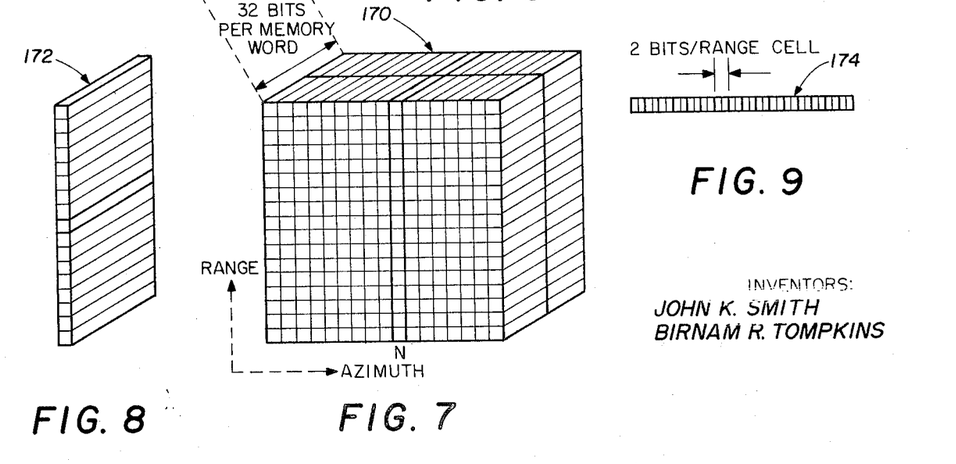
FIG. 7 is a diagrammatic illustration of the organization of the core memory of the scan-to-scan processor of the invention.
FIG. 8 is a diagrammatic illustration of an azimuth bin of the memory shown in FIG. 7.
FIG. 9 is an illustration of a memory word utilized in the core memory organization shown in FIG. 7.

As previously noted, the selected area of interest is divided in range/azimuth cells which are ground stabilized during the processing interval. The memory storage required for processing of the range/azimuth cells is supplied by the memory 160 which is a 16kx 32-bit core memory which can store 16,384 memory words of 32 bits each. The core memory 160 is organized as shown in FIG. 7 and is denoted by the numeral 170. By considering the memory as a matrix, one axis is selected to represent the azimuth bins. Each azimuth bin then contains range words, as illustrated by the azimuth bin generally designated as 172 in FIG. 8. Each range word contains 16 range cells of two bits each, as illustrated generally as memory word 174 in FIG. 9.

NORTH STABILIZATION CONTROLLER

The north stabilization controller 22 shown in FIG. 1 enables scan-to-scan processing in the automatic detection system during an aircraft turn. To accomplish this function, the 16kx 32-bit core memory 160 is actually north stabilized. Before the start of each scan, the aircraft heading is monitored by the north stabilization controller 22 and during the scan the output of the pulse-to-pulse processor 24 (FIG. 1) is processed with data from the proper memory address. To determine the proper memory address for each azimuth bin in the core memory 160, the following equation is used:

Memory Address = Az Bin Number + Heading/Antenna Beamwidth    1

Figure 10:
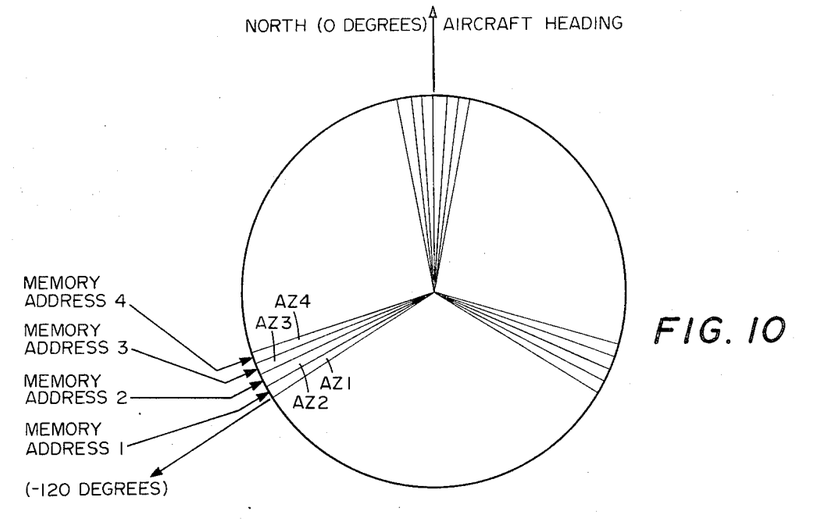
FIGS. 10 and 11 are diagrammatic illustrations of the variation of the present core memory in accordance with the north stabilization circuitry of the invention.
Figure 11:
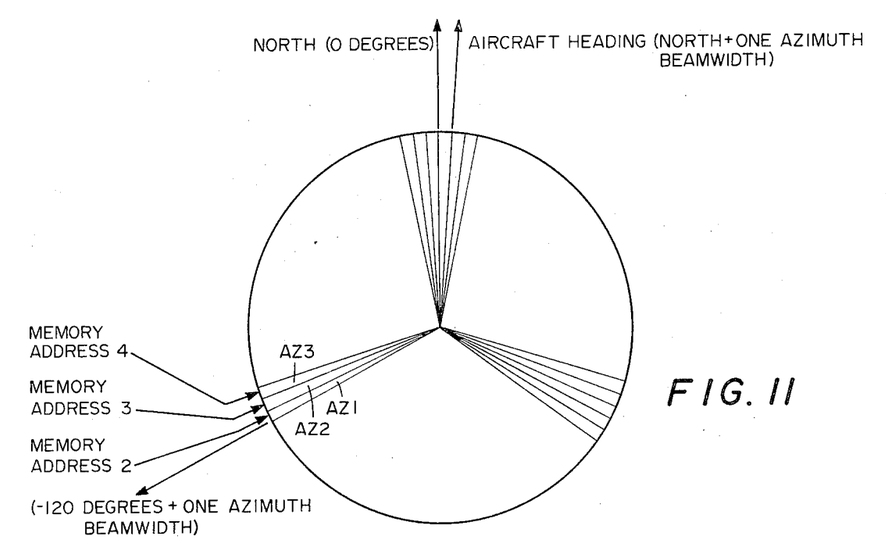

The resulting memory address is rounded off to the nearest integer. FIGS. 10 and 11 illustrate how the north stabilization is accomplished within core memory 160. These figures illustrate the various azimuth bins in relationship to the heading of the aircraft. FIG. 10 illustrates the processing of each azimuth bin in core memory 160 when the aircraft is headed due north. Note that azimuth bin 1 is processed in memory address 1, azimuth bin 2 is processed in memory address 2, and so on. However, if the aircraft heading is changed by one azimuth beamwidth as shown in FIG. 11, then azimuth bin 1 is processed in memory address 2, azimuth bin 2 is processed in memory address 3 and so on. This method of address shifting insures that the area being covered by the present automatic detection system is processed in the same memory location during each scan.

RANGE STABILIZATION CONTROLLER

To perform scan-to-scan processing for an interval of one second, the processor 24 must be ground stabilized by the range stabilization controller 20 within limits implied by the range and azimuth resolution of the processor. The severest requirement for this processor is due to the high range resolution when the shortest range is selected. To meet these requirements, the range stabilization controller attempts to hold the accumulated error in range at any range/azimuth location to less than 20 percent of the range resolution for all aircraft velocities. Due to the low azimuth resolution of the processor 24, it is not generally required to correct for azimuth shift of information during the processing interval.

Figure 12:
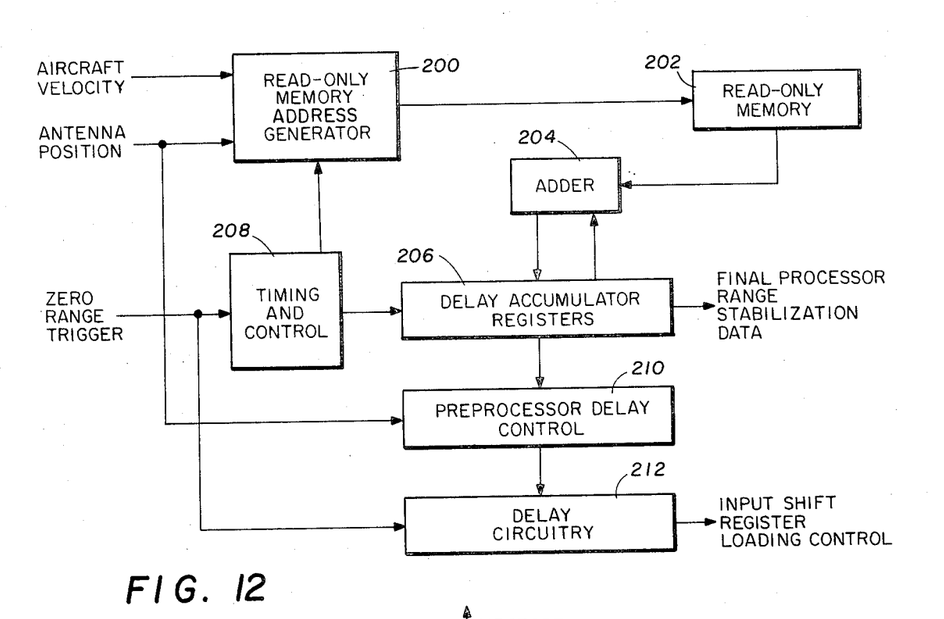
FIG. 12 is a block diagram of the range stabilization circuitry of the invention.

FIG. 12 illustrates in block form the range stabilization controller 20. An indication of the aircraft velocity and the radar antenna position is fed to a read-only memory address generator 200. The output of the address generator 200 controls a read-only memory 202. The output of memory 202 is fed through an adder 204 to delay accumulator registers 206. The output of the registers 206 is fed back to the adder 204. The output of the register 206 is also fed as a final processor range stabilization signal for application to the range stabilization controller 32. The zero range trigger is applied to a timing and control circuit 208 for generation of timing controls to the generator 200 and to the registers 206. The antenna position is fed to the preprocessor delay control circuit 210 which receives the output from the registers 206. A signal is applied from the preprocessor delay control 210 to delay circuitry 212, which also receives the zero range trigger. The output of the delay circuitry 212 is the input shift register loading control for application to the pulse-to-pulse processor 24.

Figure 13:
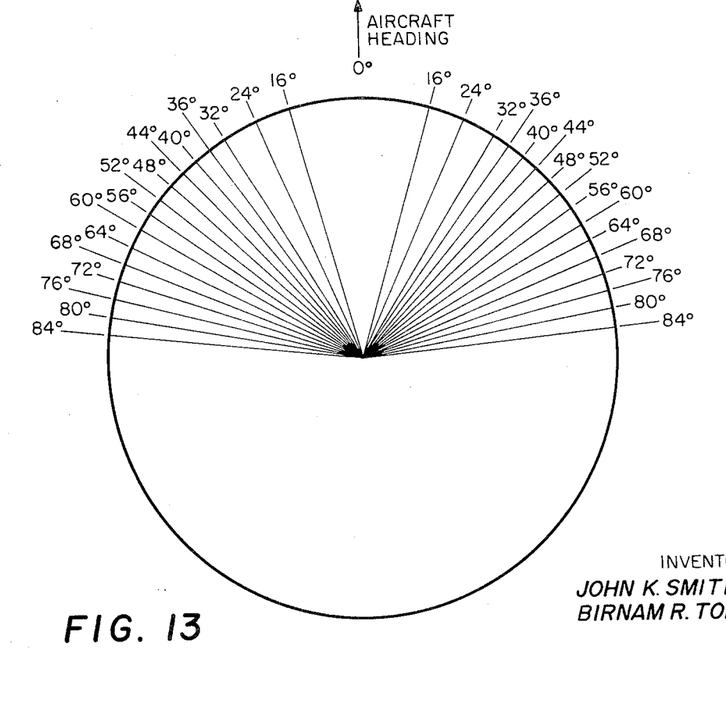
FIG. 13 is a diagrammatic illustration of the memory organization utilized by the range stabilization circuitry of the invention.

As best shown in FIG. 13, to accomplish the range stabilization control provided by the circuitry shown in FIG. 12, the area to be processed is divided into pie sections of unequal size. The pie sections range from 0° which is representative of the aircraft heading, to 90° on either side thereof. The read-only memory 202 shown in FIG. 12 is a conventional bipolar transistor memory which stores range delay information for different ranges of aircraft velocities in each of the pie sections shown in FIG. 13. This information is in the form of delay increments which are used to determine how much to shift in time the loading process of the pulse-to-pulse processor shift registers to match the aircraft motion.

Figure 14:
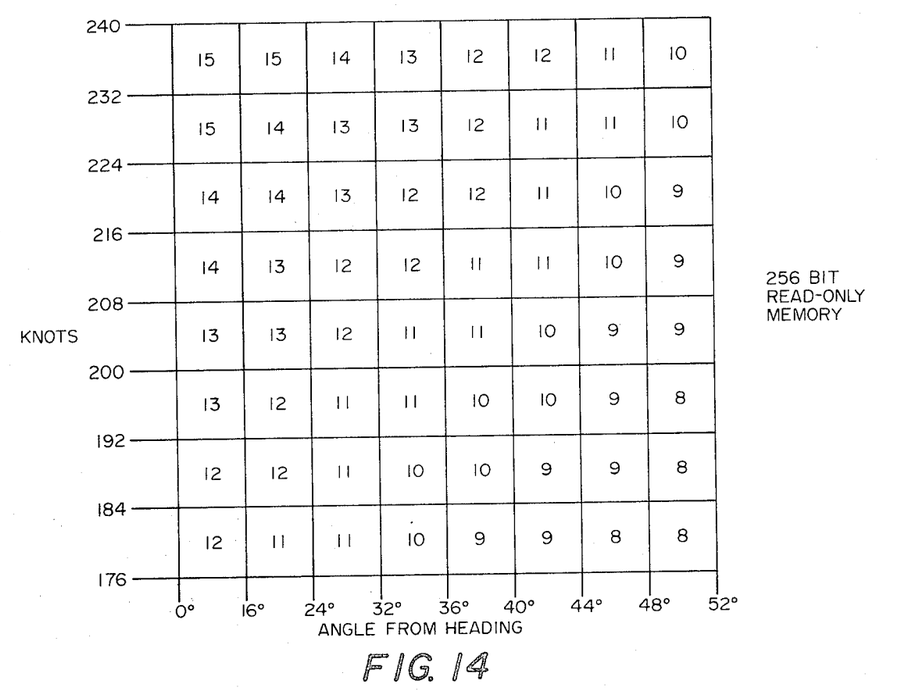
FIG. 14 illustrates a portion of the data matrix stored in the memory of the range stabilization circuitry of the invention.

FIG. 14 illustrates one-third of the information stored in the read-only memory 202. The information illustrated in FIG. 14 and additional information, not shown for ease of illustration, is stored in three 256-bit read-only memories which make up the memory 202. The memories are conventional and are organized into 8 × 8 × 4 matrices. One axis of the memory represents the aircraft velocity and one axis represents the antenna position relative to aircraft heading. For each combination of velocity and antenna position, a 4-bit word is stored which represents the number of delay increments required for each scan. This number varies from 2–15 and is shown in the center of each block in the matrix of FIG. 14.

For angles greater than 90°, the sign of the range delay changes and the number of range increments can be found by subtracting the angle from 180° and using the difference for addressing the read-only memory.

In operation of the circuitry shown in FIG. 12, the antenna position is fed to the read-only memory address generator 200 and is converted to the correct angle between zero and 90° to address the proper read-only memory. The velocity information is likewise converted to the proper read-only memory address. The output of the read-only memory 202 is then transferred to the proper delay accumulator of the registers 206 for that azimuth section. On the next four scans, the output of the read-only memory 202 is added through adder 204 to the previous value in the accumulator registers 206. In this manner, the proper delay will accumulate over the five scan time increment.

On the first scan of a processing interval, the shift register clock within the registers 206 will start at exactly the desired initial range. On the next four sweeps, the shift register clock will start at the desired range ± the delay increment signified in the accumulator registers for each azimuth location. To delay the clock for less than a full period, a tapped delay line in the delay circuitry 212 is used to divide delays at selected intervals. Thus, the number of range increments stored in the accumulator registers 206 is first used to determine the number of whole periods to delay the clock. The number is then used to determine where to tap off the delay line in the delay circuitry 212. At the end of five scans, the numbers in the accumulator registers 206 are sent to the final processor to be used by range stabilization controller circuitry 32 for control of the final processor. The registers 206 are then cleared.

FINAL PROCESSOR

Figure 15:
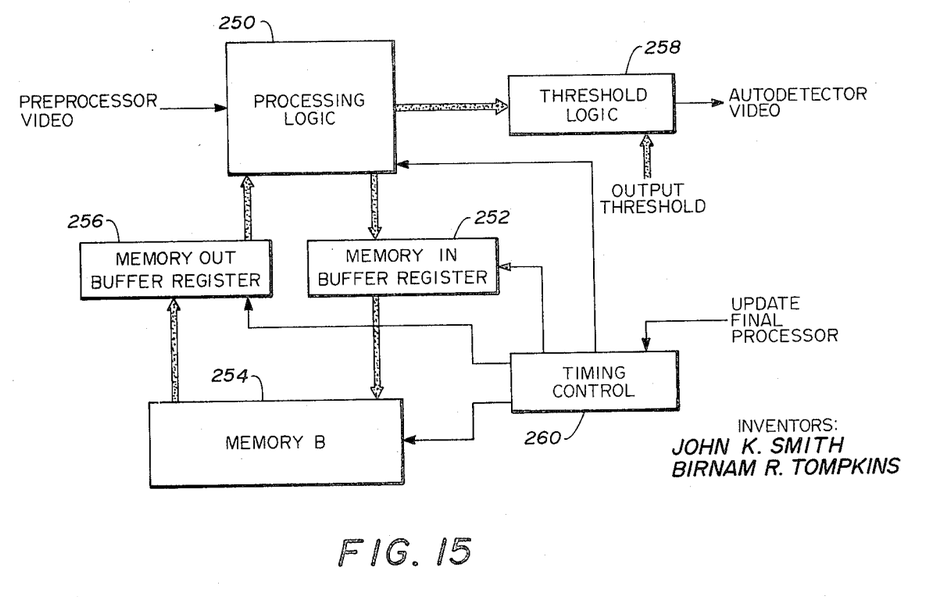
FIG. 15 is a block diagram of the final processor of the invention.

FIG. 15 illustrates in block diagram form the final processor of the system. Preprocessor video signals are fed through processing logic 250 which feeds data through a memory in buffer register 252 to B core memory 254. The output of memory 254 is fed through a memory out buffer register 256 and applied through the processing logic 250. The output of the processing logic 250 is fed through a threshold logic 258 and applied as the automatic detector video signal for display. An output threshold signal may be applied to the threshold logic 258 for threshold control. Timing signals are fed from a timing control circuit 260 to the logic 250, registers 252 and 256 and memory 254. An update final processor signal is applied to the timing control 260. Processing mode signals are also applied for control of the processing logic 250.

As previously noted, the preferred mode of operation of the final processor is the linear-up/down mode, wherein a register is used to accumulate data from each range cell. Each time the preselected scan-to-scan threshold is exceeded, a value of one is added to the stored value in the register. When the threshold is not exceeded, a value of one is subtracted from the value in the register. A target is declared whenever the stored value exceeds an adjustable threshold which may be set by the operator to a value between 1 and 7 within the threshold logic 258.

As previously noted, the function of the final processor shown in FIG. 15 is to discriminate between targets and false alarms by processing the data for a period longer than a lifetime of large clutter spikes. The timing control 260 is initiated by the commands sent from the preprocessor timing for updating of the final processor. The core memory 254 used to store data in the final processor is addressed so that the proper data is available to be processed with the data coming from the preprocessor. This data is processed by the linear-up/down mode of operation and is then relocated in its proper memory location. The processed data is likewise sent through the threshold logic 258, and if the data exceeds the selected threshold setting, a valid target is declared. The automatic detector video is then sent to the display with appropriate sweeps for operation thereof.

Utilization of the linear-up/down mode of operation of the final processor requires a minimum of three bits for each range cell. A dedicated memory system is selected for use with the present final processor. A 4K × 73-bit memory system provides three bits for each range/azimuth cell, plus an additional bit in each range/azimuth cell which may be used to aid in performing the azimuth stretch and ground stabilization.

North stabilization in the final processor shown in FIG. 15 is desired to provide long-term processing during an aircraft turn. To accomplish this, the memory 254 is north stabilized in the same manner as the preprocessor as previously described. Equation (1) previously described would, however, be changed to account for an azimuth resolution of two beamwidths rather than one. Additionally, ground stabilization is required for the final processor to allow long-term processing. Past histories in the memory 254 must then be shifted both in range and in azimuth to account for aircraft motion. To accomplish the shift in range, the accumulated delay in the preprocessor range delay circuitry is examined at the end of every preprocessor processing interval.

The accumulated delay in increments is used to determine the number of whole range cells the data must be transferred. The information in the final processor is then shifted in memory 254 by the determined amount. To account for the remaining delay, the processing is implemented to include a range track function in the direction of range delay. The track operation has been expanded to not only track in range, but also in azimuth to take care of target movement from one azimuth bin to another caused by aircraft motion.

The track option for operation of the processing logic 250 is best illustrated by reference to FIG. 16. This FIGURE illustrates a flow chart which describes the logical sequence involved in the track operation of the processing logic 250. The flow chart describes the operation to be performed when the input for the third range cell in the second azimuth bin (R3, A2) of memory 254, as shown diagrammatically in FIG. 17, is received in the final processor. If this data is input at 270, a decision is made as to whether or not the input for R3, A2 is zero or one. This initiates the search to determine whether or not a target has moved out of a range cell, and if so, where the new position for the target may be found. When the new position is found, the past history of the target is shifted to the newly located location. If it is determined at 270 that R3, A2 is a logic "one", the normal linear up/down operation to be subsequently described is performed at 272. If R3, A2 is a logic "zero", a search is made at 274 to determine if the input for R2, A2 is a "one". If so, the values of the contents in the memory for R2, A2 and R3, A2 are compared at 276.

If R3, A2 is less than R2, A2, the value for R2, A2 becomes the past history for R2, A2 at 278. If R3, A2 is greater than R2, A2, then the value of R3, A2 becomes the past history for R2, A2 at 280 and the value for R3, A2 is then counted down at 282 as in the normal linear-up/down operation.

If it is determined at 274 that the target has not shifted closer in range by the fact that R2, A2 is a "zero", a check is then made to determine whether or not the target is shifted in azimuth. First, it is determined at 284 whether or not the value stored in the memory for R3, A2 is one or greater. If not, the target has not shifted in azimuth. If so, it is then determined at 286 whether or not the output from the adjacent unstretched azimuth bin from the preprocessor (R3, A1-B) as shown in FIG. 17, is a logical "one". If not, then the target has not shifted in azimuth. If so, then the stored values for R3, A2 and R3, A1 are compared at 288 and the larger of the two values becomes the past history for R3, A1 at 290 and 292. The value for R3, A2 is then counted down in the normal manner for the linear-up/down operation. The criteria that the output from the adjacent unstretched azimuth bin is a logic "one" is important because a real target could move only one unstretched azimuth cell. This requirement helps to prevent false alarms from building up in the system. The second requirement that the value stored in the memory for R3, A2 is "one" or greater helps to decrease the chance of tracking a false alarm. The azimuth search and track does not need to be reformed for azimuth bins within 30° of the aircraft heading, since the target will remain in the same azimuth bin for a sufficient period to allow adequate processing.

Referring again to FIG. 15, in processing operation with associated stretching and ground stabilization control, the data is output from the preprocessor to the processing logic 250 for the first of every two unstretched azimuth bins, and the proper azimuth bin in the final processor memory 254 is addressed. The new data is stretched in range by combining with a logic OR function in the processing logic 250 every consecutive four range cells and storing the fourth bit of the final processor range cell. When the data is received from every second unstretched azimuth bin in the preprocessor, the data is combined by a logical OR function in the processing logic 250 with the data in the fourth bit of each range cell. This stretched data is combined with the stored past history to perform the final processing with the track functions previously discussed.

All of the data from the preprocessor is thus processed by the system shown in FIG. 15 on every fifth scan. The following scan is used to perform the range stabilization previously described. During the scan, the stored range delay from the preprocessor range stabilization controller 20 is monitored and the information is used to properly shift the data in the final processor memory 254 to its proper location by proper routing through the registers 252 and 256. No processing or data shifting is performed in the final processor during the final three scans of the scan-to-scan processing period. During each scan, however, the stored information for each range/azimuth cell is sent through the threshold logic 258 to determine if a target has been detected.

To insure that a target will not disappear before the symbol may be placed over it by the operator, logic is included in the system to force the target to persist for a minimum of twenty scans. This is accomplished by changing the processing logic 250 when the stored value in a range cell is equal to or greater than the threshold set in threshold logic 258. When the threshold is reached for the first time, the value stored in the range cell is automatically set to a maximum value of seven. The range cell must then receive a string of consecutive "zeros" from the preprocessor before it will fall below the threshold. If it does not receive enough consecutive "zeros" the range cell will again be set to maximum value. This procedure aids the operator by helping to eliminate flickering on he display 40 caused by a small or fluctuating target. When the operator desires to change range scales for the system, a clear cycle is then initiated through the final processor to allow all the accumulated past history in the memory 254 to be erased. This erasure is accomplished during the next antenna scan and allows the processing of the new range to begin immediately without interference from the past history.

DIGITAL SCAN CONVERTER

The digital scan conversion of the invention is important in eliminating the need for a conventional scan converter tube for the display 40, thus providing a totally digital system which not only offers improved reliability and maintainability, but also provides a better radar map because of improved processing resolution and integration capabilities of the digital system. An important aspect of the digital scan converter 38 is that the core memories used in the preprocessors 24 and 26 and the final processor may be utilized as storage for the digital scan converter 38. The digital scan converter operates on both automatically detected targets from the final processor and low resolution video from the radar receiver 10. Low resolution video requires additional processing to be described whereas the high resolution video has already been processed by the automatic detection logic previously described and can be displayed from the final processor memory 254 without further processing.

Figure 18:
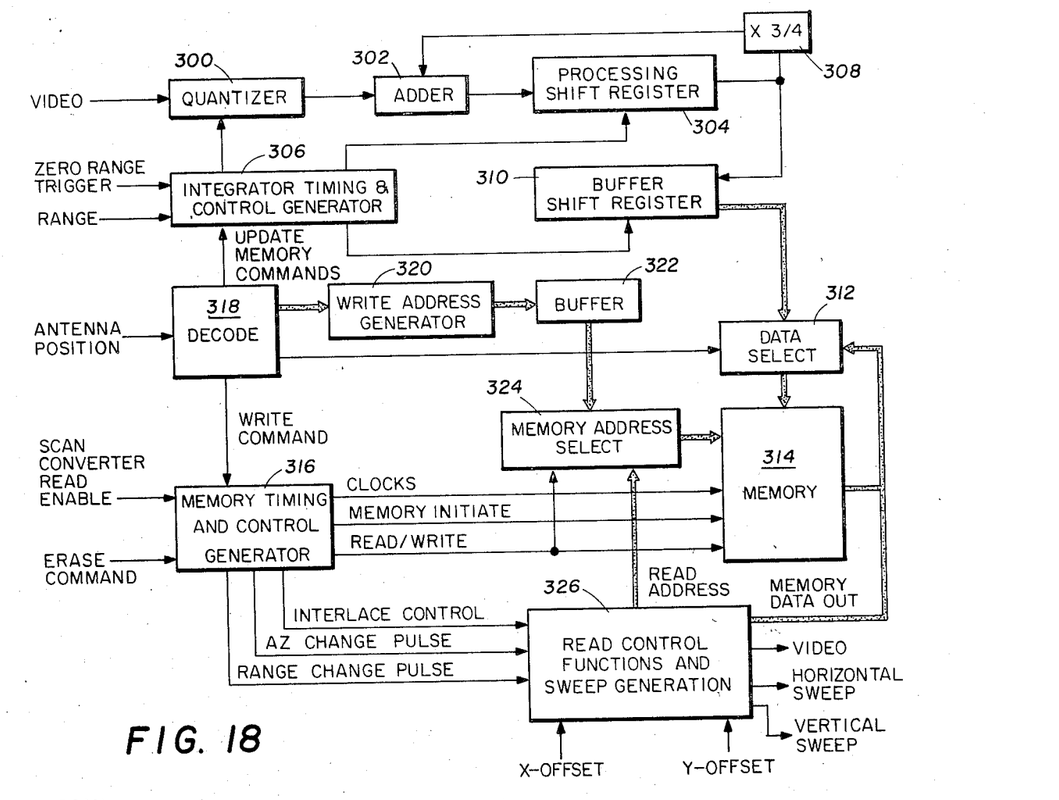
FIG. 18 is a block diagram of the digital scan converter of the invention.

FIG. 18 illustrates in block diagram the digital scan converter of the invention. The low resolution video from the radar receiver 10 is fed to a quantizer 300 which generates a digital signal to an adder 302. The output of the adder 302 is integrated in a processing shift register 304 on a pulse-to-pulse basis until a command is applied from the integrator timing and control generator 306 to update the memory. The shift register 304 is a six-bit 152-word register, and includes a feedback circuit 308 to provide a feedback gain of ¾. Upon receiving an update command, the four most significant bits of the shift register 304 are loaded into a buffer shift register 310. This information is then loaded through a data select circuit 312 into the core memory 314 which comprises a portion of the core memories 160 and 254 previously described. The rate at which the four most significant bits of information are loaded into the memory 314 is determined by the memory timing and control generator 316 which generates clock signals, memory initiate signals and read/write signals. A scan converter read enable signal and an erase command signal are applied to the memory timing and control generator 316 for control thereof.

The zero range trigger and an indication of the range are fed to the integrator timing and control generator 306. The antenna position signal is fed to a decode circuit 318. The antenna position information is supplied from an absolute value shaft angle encoder located on the radar antenna assembly. When the antenna scan reaches the end of each azimuth bin, a memory update command is generated from the decode circuit 318 and is applied to the integrator timing and control generator 306. The azimuth position is also supplied by the decode circuit 318 to the write address generator 320 and through the buffer 322 for control of the memory address select circuit 324.

The select circuit 324 updates the azimuth bin in the memory 314 with new information while not interfering with the read process. A read/modified/write cycle is used to update each word addressed in the memory 314. When a memory update command is generated by the decode circuit 318, the word containing the appropriate azimuth bin is read out from the memory 314 through the read control functions and sweep generation circuitry 326. The appropriate range data in the buffer shift register 310 is then used to update that particular azimuth position within the memory 314. Then, the updated memory word is written back into its memory location. If an erase command is received, the write address generator 320 initiates commands to write "zeros" into every range/azimuth location in the memory.

The memory timing and control generator 316 generates clock signals, memory initiate and read/write signals for control of the memory 314. Additionally, the control generator 316 generates interlace control signals, azimuth change pulses and range change pulses which are fed through the read control functions and sweep generation circuitry 326. The sweep generation circuitry 326 also generates video signals and horizontal sweep and vertical sweep signals for control of the display. X-offset and Y-offset commands are supplied through the sweep generation circuitry 326 for offset control of the display.

The 16K×32-bit and 4K×32-bit core memories comprising memories 160 and 254 previously described for use with the autodetection system of the invention provides sufficient storage for the digital scan conversion provided by the system shown in FIG. 18. To provide the desired range and azimuth resolution for low resolution video operation, the 16K×32-bit memory is divided into 131,072 range/azimuth cells of four bits each. During low resolution video operation of the system, the 240° coverage of the system is divided into 256 azimuth bins, each covering approximately 0.94°. Each azimuth bin is divided into 5/2 range cells. During sector scan of 120° or less, a maximum of 128 azimuth bins are required with each azimuth bin containing 1,024 range cells. Each memory word is actually divided into four azimuth bins and each azimuth bin in the memory word contains two 4-bit range words. This type format allows updating the memory without interfering with the critical readout of the memory.

Upon command from the memory timing and control generator 316, either a read cycle or a read/modify/write cycle is initiated. During the read cycle, the proper memory word is located and read into the read control function and sweep generation circuitry 326. The read operation is nondestructive and the information is retained in the memory 314. During the read/modify/write cycle, the proper memory word is located and then modified by the new data in the buffer shift register 310 and stored back into the memory 314.

Use of the core memory 314 as the primary storage device of the system has several distinct advantages over the conventional scan converter tube. First, the core memory allows an infinite storage time if desired for single sweep operation. Exact read/write registration is also inherent in the present digital system. The time required to completely erase all past history in the memory system may be set as fast as 33ms. With the amount of memory available because of the automatic detection requirements, sixteen shades of gray may be provided to present a pleasing display. The video supplied by the read control functions in sweep generation circuitry 326 controls a multipurpose display unit of conventional structure using a concentric ring-type of raster. The field time for the display for normal scan operation of the system is 17.7msec, or during sector scan operation the field time is 19msec.

The memory timing and control generator 316 provides all of the major timing functions for the memory 314 and the read control functions and sweep generation circuitry 326. For the memory 314, signals are generated from the generator 316 to initiate memory cycles, select the proper type of cycle and provide the basic clock rates required. Timing signals are provided from which the read control functions and sweep generation circuitry 326 can generate the proper read address for the memory 314 and the proper interface control. Signals are sent to the sweep generator circuitry 326 to enable sweeps to be generated which are synchronous with the data being read from the memory.

The read control functions portion of the circuitry 326 operates to read data out of the memory 314 in concentric rings. During slow scan operation, the time required to read out 240° of a range ring is 128 microseconds. This time is followed by a 10-microsecond dead time which is required for a display retrace. During this time, new data is used to update the memory 314. During sector scan operation of the system, the time required to read data for 120° of a range ring is 64 microseconds, this period also being followed by the 10 microseconds dead time. Range data is read into the memory 314 to provide for an exact 4 to 1 interlace for the remaining aircraft displays. To accomplish this, the range rings stored in the memory 314 are divided into four fields of an equal number of range rings. Field number 1 consists of rings 1, 5, 9, etc.; field number 2 comprises rings 2, 6, 10, etc., with the third and fourth fields consisting of rings 3, 7, and 11 and 4, 8, and 12, respectively. This 4 to 1 interlace technique provides a continuous, flicker-free display. The field time is calculated by multiplying the number of range rings in a field by the total time required for reading the range ring.

Figures 16, 17, 19:
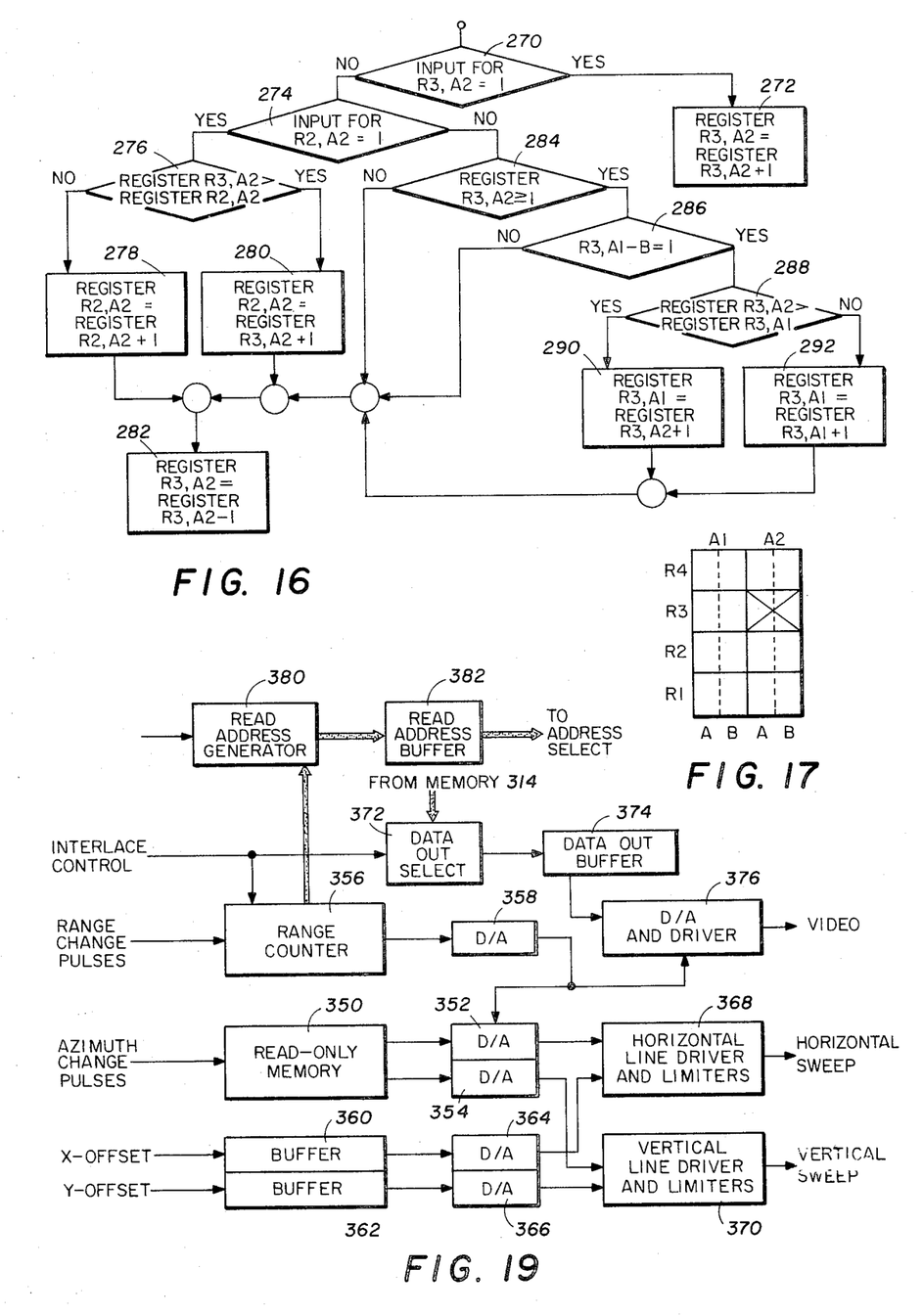
FIG. 16 is a flow diagram illustrating the operation of the track technique of the final processor shown in FIG. 15.
FIG. 17 is a diagrammatic illustration of the storage of memory words in the memory of the final processor.
FIG. 19 is a block diagram of the read control and sweep generator of the scan converter of the invention.

FIG. 19 illustrates the read control functions and sweep generation circuitry shown in FIG. 18 in greater detail. Read sweeps are generated by a 512 word read-only memory 350 which receives azimuth change pulses from the control generator 316, and stores sine and cosine function values ranging from 0° to 90°. By changing quadrant and azimuth data appropriately, the stored first quadrant sine and cosine function values can be used to generate the full 240 sweep required from the memory 350. These binary sine and cosine function outputs are applied through digital-to-analog converters 352–354, where the function outputs are changed to analog waveforms which are modulated by a range ramp generated from a range counter 356. The range count from 356 is a 7-bit counter which is incremented by one, each time a range ring is completed within the range change pulses signals. The seven bits of read range position data are used as the seven most significant bits of a 9-bit digital-to-analog converter 358.

Range ring field interlace is controlled by the remaining 2-bits of the signal. For the first field, the last two least significant bits are set to (00). When reading field No. 2, the bits are set to (0,1), and bits are set to close (1,0) and (1,1) on fields Nos. 3 and 4, respectively. When the resulting range ramp is used to reference the sine and cosine digital-to-analog converters 352 and 354, the required sweep waveforms are generated therefrom to provide a perfectly interlaced concentric raster scan.

The X and Y-offset voltages are fed through buffers 360 and 362 and through digital-to-analog converters 364 and 366. The X and Y-offset voltages are then applied to a horizontal line driver and limiter 368 and to vertical line driver and limiter 370, wherein the voltages are summed with the read sweep. Limiter 368 thus generates the horizontal sweep and limiter 370 thus generates the vertical sweep for the system, with long term ground stabilization provided. The limiters 368 and 370 prevent overscan of the conventional display.

Interlace control is also applied through the data out select circuit 372, which receives the output from the memory 314 and applies the output through the data out buffer 374 to the digital-to-analog and driver circuit 376. A portion of the range ramp from the range counter 356 is summed with the reference voltage for the digital-to-analog converter 376 to provide compensation for the change in sweep speed experienced as the scan moves out in range. The output for the range counter 356 is applied through the read address generator 380 and through the read address buffer 382 for proper addressing of the address select circuit 324.

Figure 20:
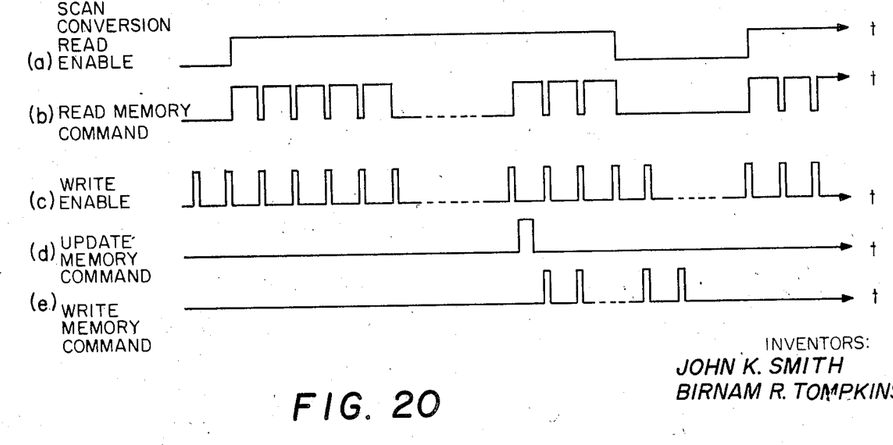

FIG. 20 illustrates timing signals for operation of the circuitry shown in FIGS. 18 and 19. FIG. 20a illustrates generation of the scan conversion read enable signal which is applied to the memory timing and control generator 316 by suitable timing control circuitry, not shown. FIG. 20b illustrates the generation of the read memory command signal applied by the memory timing and control generator 316 to the memory 314 during occurrence of the positive-going portion of the scan conversion read-enable signal. FIG. 20c illustrates the generation of the write enable command generated by the memory timing and control generator 316 in a periodic manner. FIG. 20d illustrates the update memory command applied from the decode circuit 318 to the integrator timing and control generator 306 during each cycle of operation. FIG. 20e illustrates the write memory command applied from the decode 318 to the memory timing and control generator 316 during each cycle.

Whereas the present invention has been described with respect to specific embodiment thereof, it will be understood that various changes and modifications will be suggested to one skilled in the art, and it is intended to encompass such changes and modifications as fall within the scope of the appended claims.

What is claimed is:

1. An automatic target detection and scan conversion system for use with radar systems comprising:
   circuit means for receiving a radar video signal,
   threshold circuitry for passing only portions of said video signals above a threshold to indicate target reflections,
   a preprocessor means responsive to the output of said threshold circuitry to generate an output signal when a predetermined number of target reflections occur during selected number of radar antenna scan;
   a final processor means for discriminating between valid target reflections and false alarms for generating an output video signal of the valid target reflections for display, said final processor means including a register means, means for adding a value to said register means upon the occurrence of an output signal from said preprocessor means, means for subtracting a value from said register means if an output signal is not generated from said preprocessor means, and
   means for sensing when the stored value in said register means exceed a predetermined valve.

2. An automatic detection system according to claim 1 further comprising:
   means for range stabilizing said pulse-to-pulse processor circuitry, said scan-to-scan processor circuitry and said final processor means in dependence upon the velocity of the radar carrier.

3. An automatic detection system according to claim 1 further comprising:
   self-regulating means for stabilizing said scan-to-scan processor circuitry and said final processor means with respect to a predetermined azimuth direction to enable automatic detection of a target reflection during a turn of the radar carrier.

4. An automatic detection system according to claim 1 further comprising:
   automatic gain control circuitry for varying the input false alarm rate of said system on a scan-to-scan basis with varying clutter density.

5. The automatic detection system according to claim 1 further including a digital scan converter means operatively responsive to the output of the final processor for converting the processed video signals for display at a flicker free rate, said digital scan converter means including a display for displaying the video signals at the flicker free rate.

6. An automatic detection system according to claim 1 further comprising:
   digital scan converter means including a memory for storing the output of said final processor means, and
   display means operable in response to said digital scan converter means for displaying valid target reflections at a flicker-free rate.

7. An automatic radar detection system comprising:

a radar system for generating radar video signals,
   automatic gain control circuitry responsive to a predetermined false alarm rate for varying the amplitude of said radar video signals,
   threshold circuitry for passing only reflected radar video signals above a selected threshold,
   a pulse-to-pulse processor connected to the output of said threshold circuitry for generating a signal representative of the existence of a valid target return only if said target return occurs for a predetermined consecutive number of radar returns,
   means for stabilizing said pulse-to-pulse processor with respect to range in dependence upon the velocity of the radar carrier,
   a scan-to-scan processor connected to the output of said pulse-to-pulse processor for generating a valid target signal only when a predetermined number of target returns occur during a selected number of radar antenna scans,
   means for stabilizing said scan-to-scan processor with respect to range in dependence upon the velocity of the radar carrier,
   means for stabilizing said scan-to-scan processor with respect to a predetermined azimuth,
   a final processor for processing the output from said scan-to-scan processor longer than the lifetime of clutter spikes to generate an output signal representative of valid target returns,
   means for stabilizing said final processor with respect to range in dependence upon the radar carrier velocity,
   means for stabilizing said final processor with respect to a predetermined azimuth,
   a scan converter means coupled to the radar system and final processor for producing display control signals at a flicker-free rate, and
   display means for displaying the control signals at a continuous flicker-free rate.

8. An automatic radar detection system according to claim 7 further comprising:
   a memory arranged in a matrix according to azimuth and range for storing representations of target returns to enable the operation of said scan-to-scan processor and said final processor.

9. An automatic radar detection system according to claim 8 wherein said scan conversion means utilizes said memory to control the operation of a multi-mode display.

10. A method of automatic target detection and scan conversion comprising:
    scanning an area of space with pulses of electro-magnetic energy;
    detecting reflected pulses of the electro-magnetic energy;
    processing said reflected pulses in a pulse-to-pulse processor to produce a signal representative of a plurality of consecutive target indicating pulse returns within a selected number of pulses;

processing any pulse-to-pulse processor signals in a scan-to-scan processor to produce a signal representative of the receipt of a desired plurality of pulse-to-pulse processor signals within a selected number of radar scans;

processing the scan-to-scan processor signal output to discriminate between targets and false alarms by processing said scan-to-scan output signals for a period sufficient to distinguish target indicating signals from false alarm signals;

processing the detected target output signals and electromagnetic energy signals through a digital scan converter including storing the video display control signals, and reading out the stored video display control signals to provide a circular raster scan for a display means at a flicker free rate.

* * * * *